United States Patent
Riello et al.

(10) Patent No.: US 6,204,585 B1
(45) Date of Patent: Mar. 20, 2001

(54) WORK UNIT HAVING AN INTEGRALLY MOUNTED DRIVE UNIT

(75) Inventors: Andrea Riello; Zeno Borsaro, both of Minerbe (IT)

(73) Assignee: Riello Macchine Transfer SRL, Minerbe (IT)

( * ) Notice: Subject to any disclaimer, the term of this patent is extended or adjusted under 35 U.S.C. 154(b) by 0 days.

(21) Appl. No.: 09/216,498

(22) Filed: Dec. 18, 1998

(30) Foreign Application Priority Data

Dec. 19, 1997 (IT) .............................. MI97A02831

(51) Int. Cl.$^7$ .................................................. H02K 17/00
(52) U.S. Cl. .............................. 310/159; 310/12; 310/15; 310/20; 310/80; 310/98; 310/75 R
(58) Field of Search .............................. 310/12, 37, 75 R, 310/80, 159

(56) References Cited

U.S. PATENT DOCUMENTS

| | | | | |
|---|---|---|---|---|
| Re. 29,081 | * | 12/1976 | Grundmann | ............................ 310/80 |
| 2,884,819 | | 5/1959 | Roubloff . | |
| 3,577,049 | * | 5/1971 | Madurski | .............................. 318/138 |
| 3,753,384 | | 8/1973 | Anfindsen . | |
| 3,894,255 | * | 7/1975 | Newton, Jr. | ............................ 310/80 |
| 4,088,417 | | 5/1978 | Kosmowski . | |
| 4,197,488 | * | 4/1980 | Kant | ...................................... 318/115 |
| 4,214,180 | * | 7/1980 | Kuwako et al. | ........................ 310/80 |
| 4,393,319 | * | 7/1983 | Bock | ........................................ 310/80 |
| 4,496,865 | * | 1/1985 | Allen et al. | ............................. 310/80 |
| 4,521,707 | * | 6/1985 | Baker | ...................................... 310/80 |
| 4,557,153 | * | 12/1985 | Ulbing | ........................................ 74/2 |
| 4,560,894 | * | 12/1985 | Stoll | ..................................... 310/67 R |
| 4,633,111 | * | 12/1986 | Gonzi | ..................................... 310/80 |
| 4,749,898 | * | 6/1988 | Suzuki et al. | ......................... 310/114 |
| 4,869,626 | | 9/1989 | Kosmowski . | |
| 4,958,967 | | 9/1990 | Adachi . | |
| 5,009,554 | | 4/1991 | Kameyama et al. . | |
| 5,554,897 | * | 9/1996 | Martin et al. | ........................... 310/54 |
| 5,627,420 | * | 5/1997 | Rinker et al. | .......................... 310/87 |
| 5,688,084 | | 11/1997 | Fritz et al. . | |
| 5,920,973 | | 7/1999 | Kosmowski . | |
| 5,923,108 | * | 7/1999 | Matake et al. | .......................... 310/87 |
| 5,997,223 | | 12/1999 | Kosmowski . | |

* cited by examiner

*Primary Examiner*—Elvin Enad
(74) *Attorney, Agent, or Firm*—Helfgott & Karas, P.C.

(57) ABSTRACT

A work unit for automatic machine tools is provided with a spindle that moves in translation and rotates with respect to a work axis. The spindle is housed within a sleeve that is slidable along the work axis, with the spindle being rotatable within. Rotation of the spindle is controlled by a drive unit mounted directly on the spindle and arranged inside the sleeve, which eliminates the need for a separate transmission mechanism and thereby results in a simplified construction of the work unit and an increase in performance.

7 Claims, 2 Drawing Sheets

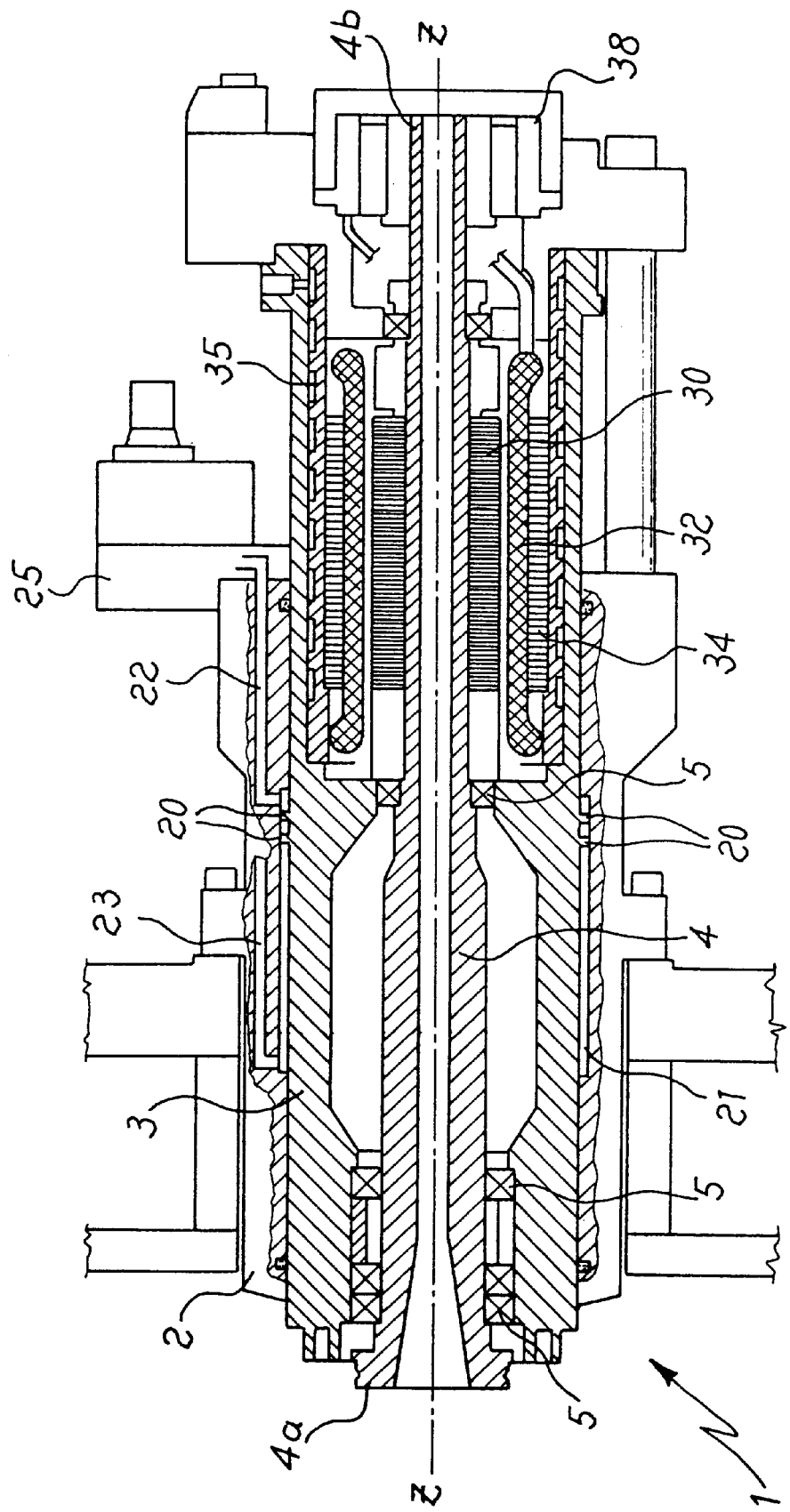

WORK UNIT HAVING AN INTEGRALLY MOUNTED DRIVE UNIT

FIELD OF THE INVENTION

The invention concerns the operating units or work units of automatic machine tools, and in particular those having a rotating table.

BACKGROUND OF THE INVENTION

The latter, also known as transfer machines, consist essentially of a series of work stations arranged round a worktable which, depending on the type of machine, may have its axis of rotation arranged horizontally or vertically; the table, rotating about its axis with controlled movement, carries the workpieces mounted on it by production personnel at an appropriate loading station, along the various stations at which a programmed cycle of operations is carried out.

The aforesaid stations comprise each at least one work unit and it is to the latter that the present invention refers.

As is already known, these units have a spindle intended to support a tool, which is customarily mounted in such a manner that apart from the rotary movement about its own work axis (generally indicated Z axis) it can also carry out translational movements along said axis.

For this purpose the spindle is commonly housed inside a coaxial sleeve, with respect to which it can rotate freely but to which it is rigidly connected with regard to the axial translational movements mentioned; consequently, when the sleeve which does not have a possibility of rotation, is caused to advance or return along the Z axis with respect to a workpiece to be machined, the spindle also makes similar movements independently of its state of rotation. It will be understood that by so doing, it is possible to carry out screw-threading or other machining of workpieces requiring a helical trajectory to be imparted to the tool.

The axial movements of the spindle and of the sleeve are obtained with hydraulic or electromechanical systems which act externally to the latter, whereas with regard to the rotation of the spindle, motors are used which are coupled to the latter by means of various types of transmission such as, for example, toothed belts and pulleys, reduction mechanisms with gears, and the like.

It is, however, important to take into account the fact that in order to impart to the spindle its rotary work movement while at the same time leaving it free to move axially in translation together with the sleeve, it is necessary to arrange suitable devices at the level of its connection to the corresponding drive motor.

Indeed, in the known operating units the motor is fixedly mounted with respect to the spindle (that is to say, it does not move in translation with it) which according to a technical solution currently widely used, for being driven has on its rearward end longitudinal splines, coupled coaxially with a shell which is also splined inside: on the shell there are then mounted pulleys or other mechanical elements suitable for receiving the motion from the motor, such that the spindle is caused to rotate by the shell owing to the coupling of their respective splines which, at the same time, allow relative movement in an axial direction as desired.

An example of a work unit having this structural configuration is described in Italian Patent Application No. MI 93 A 002548, already published and the owner thereof is the same applicant of the present application.

In the light of what has been explained, it is possible to understand that such a design of an operating unit, although it might have the advantage of being simple and reliable, nevertheless has some drawbacks which limit its performance and therefore, indirectly, also that of the unit itself.

For example, it is necessary to consider that the bulkiness resulting from the presence of the motor with the corresponding mechanical transmission, being it a toothed belt or a gear or other means, is not negligible and may create difficulties, especially in the case of machine tools having a large number of operating units: machine tools having 8 or more work stations are not in fact rare in practice, and in such circumstances the bulkiness referred to above becomes a factor that has a strongly negative effect on the complexity of the machine and therefore on the difficulty of producing the latter.

Furthermore, the inertias coming in to play and which affect the rotation of the spindle, are high in the known work units; this makes the control of such rotation difficult and can therefore reduce the precision of the machining operations carried out by the unit. The higher is the speed of rotation of the spindle, the more marked these negative effects are, and therefore they represent an intrinsic link in the achievement of higher performances and productivity of the machine tools.

OBJECTS OF THE INVENTION

In view of this state of the art, therefore, the object of the present invention is to provide an improved work unit for automatic machine tools which has structural and operational features such as to remedy the drawbacks encountered in the current known units described above.

This object is achieved by an operating unit the features of which are described in the annexed claims.

DETAILED DESCRIPTION OF THE DRAWINGS

The invention will be better understood in the light of the detailed description of some of its exemplary and non-limiting embodiments, provided below on the basis of the appended drawings in which:

FIG. 2 is a view in partial longitudinal section of a variant of the operating unit in FIG. 1.

DETAILED DESCRIPTION OF THE PREFERRED EMBODIMENTS

Figure 1:
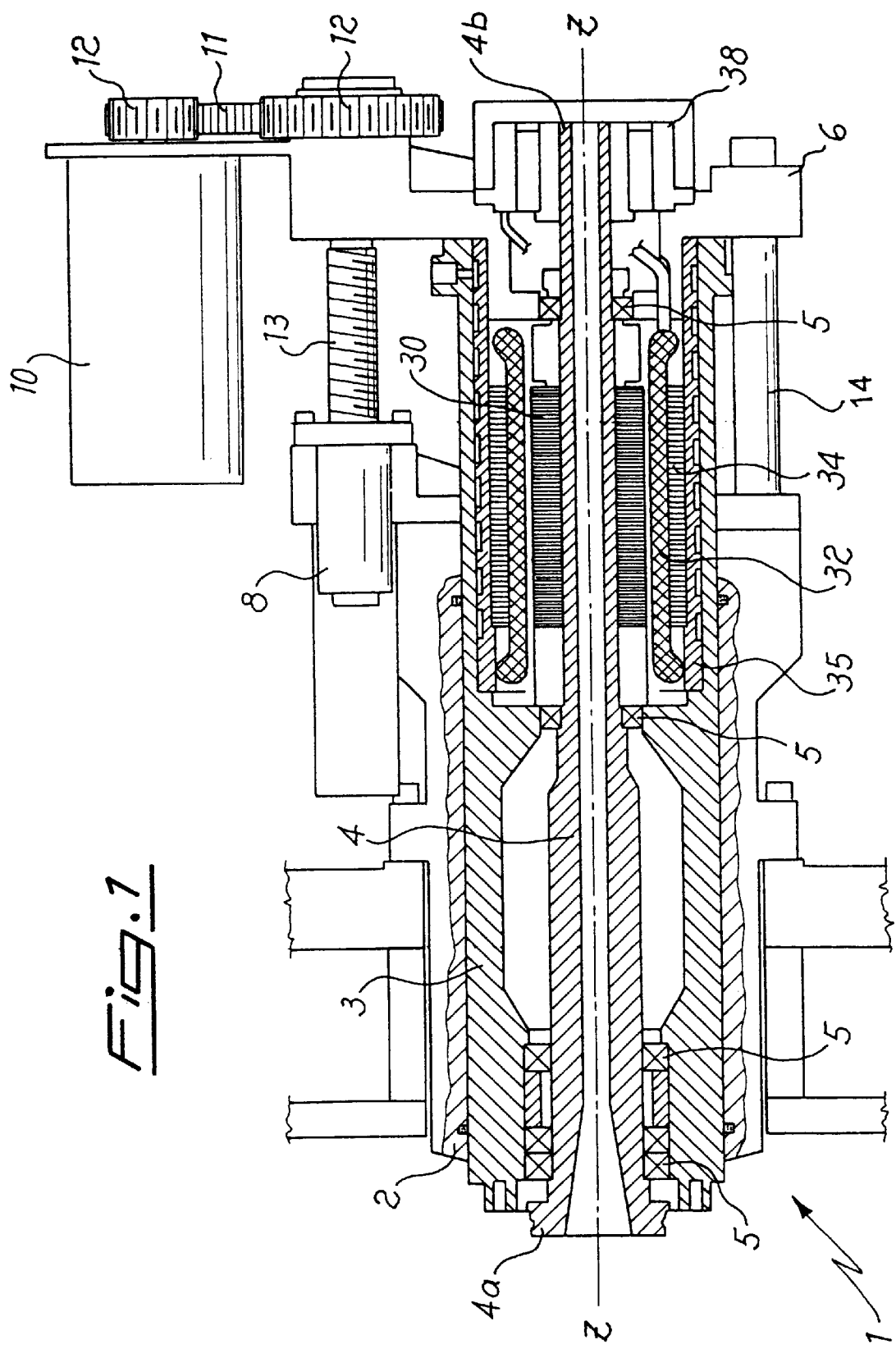
FIG. 1 is a view in partial longitudinal section of an operating unit according to the invention.

In the drawings, the reference 1 indicates as a whole the work unit of the invention, which may be of the electromechanical type as in FIG. 1, or of the hydraulic type as in FIG. 2; for the sake of brevity of the description, the elements common to both the electromechanical and hydraulic versions of the unit are indicated with the same reference numbers.

The unit 1 comprises an outer body 2, which is cylindrical and hollow inside, wherein a sleeve 3 is housed so as to be able to slide along the axis Z of the unit; the outer body 2 is fixed to the load-bearing structure of the machine tool (slightly indicated in the drawings) while the sleeve 3 encloses inside it a work spindle 4.

More specifically, the spindle 4 is supported rotatably in the sleeve 3 by a series of bearings 5, which keep it locked axially with respect to the sleeve and are arranged along it between a fore end 4a and a back end 4b of the spindle.

The sleeve 3 is provided at the rear, that is to say towards the back end 4b of the spindle, with a device 6 extending radially with respect thereto and comprising a rod 14 fixed on the outer body 2 which prevents the rotation of the sleeve itself.

For the axial movement of the sleeve 3, and therefore of the spindle 4 rigidly connected thereto, in the electromechanical version of the operating unit of this example a screw 13 and nut 8 assembly provided, which in a preferred form is of the recirculating-ball type, mounted on the outside of the body 2 with its axis parallel to the work axis of the unit (see FIG. 1).

In particular, the screw 13 is locked in an axial direction with respect to the sleeve 3 and is rotated about its own axis by a motor 10, connected thereto by means of a transmission with toothed belt 11 and pulleys 12; the nut 8, however, is rigidly connected to the sleeve 2 since it is mounted on the lug 6a of the latter.

Therefore when the screw 13 is caused to rotate by the motor 10, the nut 8 with which it is coupled moves in translation parallel to the axis Z, entraining with it the sleeve 3 to which it is rigidly connected.

Since on the other side of the sleeve 3 its lug 6 is engaged so as to be able to slide along a guide 14 parallel to the axis Z, its axial movements controlled by the screw-nut assembly are guided, apart from the coupling of the sleeve to the outer body 2, also by aforesaid guide 14 which prevents rotation thereof about its own axis.

The hydraulic version of the unit 1 differs from the electromechanical one basically in the fact that in place of the screw/nut assembly and of the other connected elements, the sleeve 3 is provided externally with two projecting circular ribs 20; advantageously, the ribs are brought close together so that between them there can be placed a sealing gasket, not indicated with a reference number in the drawings.

In connection with the ribs, in the inner wall of the outer body 2 there is an annular chamber 21 communicating, through the ducts 22 and 23 which extend in the body 2, with a hydraulic unit 25 for the supply of pressurized oil.

As can be seen from FIG. 2, the aforesaid ribs and annular chamber represent the elements of a double-acting piston controlled by the hydraulic unit 25 by means of the ducts 22 and 23.

With regard to the rotation of the spindle about the work axis Z, in both the electromechanical and hydraulic versions of the unit 1, a rotary electric motor of the asynchronous type is used, provided integrally inside it.

More particularly, on the central part of the spindle 4 there is fitted a rotor 30, round which there is a stator 34 with the corresponding winding of electrical conductors 32; the latter is in turn enclosed in a casing which, according to a preferred form of the invention, consists of a jacket 35 in which flows a cooling fluid.

The assembly consisting of the electric motor just described and of the corresponding cooling system is interposed between the spindle and the sleeve, with both of which it moves integrally in translation along the work axis Z as a result of their movements controlled electromechanically or hydraulically, depending on the type of unit 1.

The rotation of the electric motor which drives the spindle is controlled by electronic devices which are known per se, such as current rectifiers, frequency converters and the like; however, with regard to the control of the rotation of the spindle it should be realized that on the back end 4b of the latter, in the present invention there is placed a resolver 38 or other suitable means for detecting the rotations of the spindle: this positioning is particularly advantageous in so far as it makes it possible to obtain precise measurements since they are made directly on the spindle.

From what has been disclosed up to now, it is possible to understand how the operating unit of the present invention achieves the aim proposed initially.

Firstly, it can in fact be appreciated that its structure is significantly simplified owing to the fitting of the motor, or at least a part thereof as in the case of the preceding rotor 30, directly on the spindle: this solution allows to eliminate completely any mechanical or other type of transmission, between the spindle and the motor for its actuation.

Consequently, all the drawbacks of the operating units of the prior art arising from the presence of mechanical transmissions between the motor and the spindle, are overcome by the present invention.

In other words, it is no longer necessary to provide the toothed belts and pulleys, the splined shell and the matching splines of the spindle, which in the state of the art give rise to overall dimensions and inertias having a negative effect on the performance of the work unit and which have already been mentioned.

It should then be pointed out that the length of the spindle is significantly reduced by the elimination of the splines on it; furthermore, it should also be noted that because of the telescopic sliding between the spindle and the sleeve, in the known units it is necessary to provide a suitable space along the axis Z with a greater overall longitudinal dimension of the unit, owing to its moving parts (the said space depends on the sum of the length of the spindle and of the splined shell when the former is in the position of maximum advance).

Consequently, from this viewpoint also, the operating unit according to the invention is more compact with respect to those used at present, not only because the spindle is itself shorter, but also because its coupling to the shell has been eliminated. It should not be overlooked that the production costs of the spindle are also reduced, since apart from having reduced dimensions, the latter does not require particular machine operations such as those necessary for producing its splines.

Moreover, the fact that the spindle now has a shorter length, owing to the elimination of the corresponding splined part, also permits improved control of its rotation. As already stated, this is due to the possibility of fitting a device for detecting the rotations of the spindle directly on the latter, but it can also be realized that since the spindle has a shorter length its torsion deformations at the ends are more limited, in the case of same dimensions and operating conditions, with respect to a spindle of conventional type.

Also with regard to the regulation of the speed of rotation of the spindle, important advantages are obtained by the invention, with reference to what normally occurs. Indeed, such regulation is generally of the stepped type and is obtained by mounting on the splined shell adjacent pulleys of differing diameters, to which correspond mating pulleys on the output shaft of the motor, that customarily rotates at constant speed; the change in the number of rotations of the splined shell, and therefore also of the spindle to which it imparts the rotary motion, occurs by bringing into engagement one pair of pulleys or another moving the transmission belt manually between them.

This involves, apart from a stepped discontinuity in the speed regulation, also an interruption in the production cycle, since the transfer of the belt from one pair of pulleys to the other has to be carried out with the motor at a standstill.

In the operating unit according to the invention, on the contrary, regulation can be effected gradually and continuously, simply by controlling the asynchronous motor: this is possible with a certain facility by means of the modern electronic instruments now available also at low costs.

It should further be emphasised that the performance of the operating unit according to the invention is further enhanced by the provision of a system of forced cooling, since the latter makes it possible to keep under control the thermal expansion of the various elements in general and of the sleeve in particular, which could prejudice the sliding of the sleeve in the outer body and adversely affect the precision of the machining operations.

Variants of the invention with respect to its embodiments described heretofore should not, of course, be excluded.

As an indication, provision could indeed be made for the system of axial translation of the spindle to undergo modifications with respect to the electromechanical and hydraulic versions described before; in other words, it should not be excluded that in order to move the spindle along the work axis Z, other systems be used which are not those with screw and nut, or those with double-acting piston, referred to.

By the same standard, it is necessary to point out that the type of motor used for setting the spindle in rotation may be different from the asynchronous electric motor considered here.

That is to say that it should not be excluded of fitting on the operating unit of the present invention, a different type of electric motor with alternating current (for example synchronous, with or without brushes), or a motor supplied with direct current, provided of course that the effects explained above are obtained. These and other variants of the invention, however, fall within the scope of the claims which follow.

What is claimed is:

1. Work unit for a machine tool, comprising:

an outer body, a sleeve having an inner surface and housed in said outer body and capable of sliding with respect to said outer body along a work axis of the work unit, means for translating the sleeve along said work axis, a spindle supported rotatably in the sleeve and having a fore end and a back end, and driving means for rotating the spindle, said driving means being housed in the sleeve and and disposed between the fore end and the back end of the spindle.

2. Work unit according to claim 1, wherein the driving means of the spindle comprise a rotary electric motor having a rotor rotationally solid with the spindle, and a stator integral with the sleeve.

3. Work unit according to claim 2, wherein the electric motor is asynchronous and the rotor is mounted on the spindle coaxially therewith and surrounded by the stator.

4. Work unit according to any one of the preceding claims, further comprising a cooling fluid circulation system for the cooling of the driving means of the spindle.

5. Work unit according to claim 4, wherein the fluid circulation system comprises a jacket internally opposed to the sleeve, in which the cooling fluid circulates, licking the inner surface of the sleeve.

6. Work unit according to claim 1, further comprising a rotation detector device associated with the back end of the spindle.

7. Work unit according to claim 6, wherein the rotation detector device is a resolver or an encoder.

* * * * *